No. 652,615. Patented June 26, 1900.
R. T. HAYS.
BIRD TRAP.
(Application filed Apr. 7, 1900.)
(No Model.)
Fig. 1.
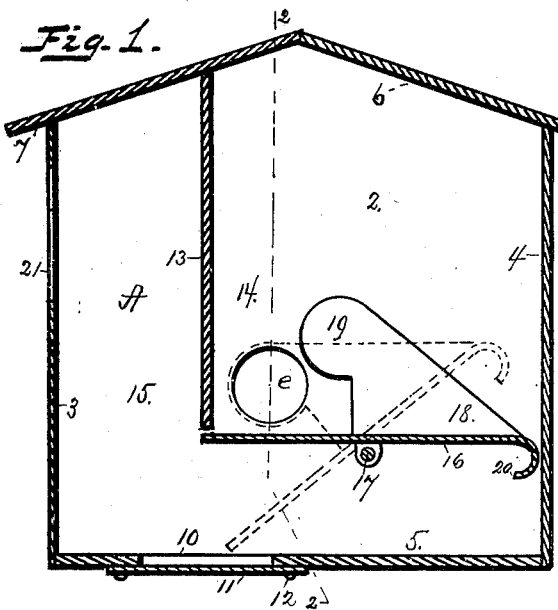
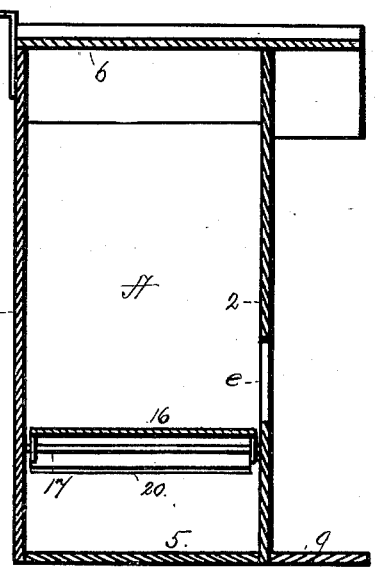
Fig. 2.
Fig. 3.
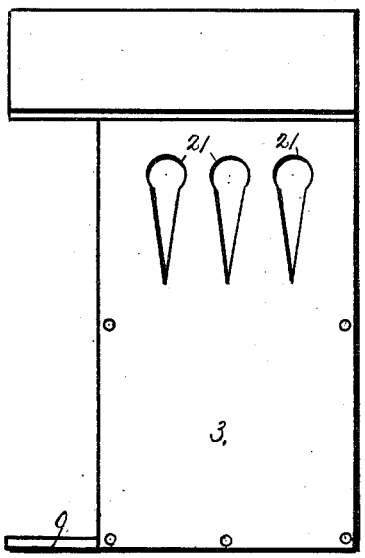
Fig. 4.
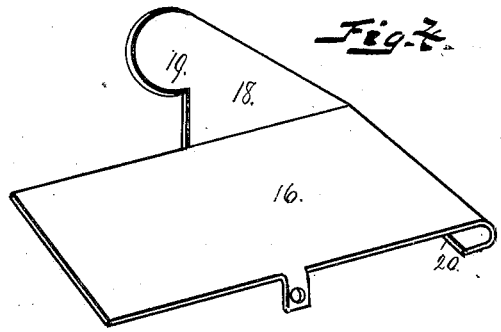
WITNESSES.
E. H. Bates
Herbert W. J. Jenner.
INVENTOR.
Richard Trabue Hays
by A. G. Heysinger
Attorney.
THE NORRIS PETERS CO., PHOTO-LITHO., WASHINGTON, D. C.

UNITED STATES PATENT OFFICE.

RICHARD T. HAYS, OF PERU, KENTUCKY.

BIRD-TRAP.

SPECIFICATION forming part of Letters Patent No. 652,615, dated June 26, 1900.

Application filed April 7, 1900. Serial No. 11,966. (No model.)

*To all whom it may concern:*

Be it known that I, RICHARD TRABUE HAYS, a citizen of the United States, residing at Peru, in the county of Oldham and State of Kentucky, have invented certain new and useful Improvements in Bird-Traps; and I do declare the following to be a full, clear, and exact description of the invention, such as will enable others skilled in the art to which it appertains to make and use the same.

My invention has relation to improvements in bird-traps; and the purpose and object are to construct and provide a trap especially designed to capture and kill the common English sparrow, noted for its voracity, its destruction of cereal and small-fruit crops, its gluttony, and associated vicious characteristics. These birds are extremely cunning in avoiding entrance to places and inclosures such as wire cages, open traps, and similar devices, but are equally desirous to enter small closed constructions provided with a small entrance and apparently suitable for housing them or providing room for nesting or roosting purposes. Taking advantage of these propensities to enter and occupy inclosures which do not excite their suspicion, I have devised a trap which they eagerly select as a supposed nest or roosting-place, but which, being entered by them, speedily and certainly destroys them.

I accomplish the purposes of my invention by the constructions and means illustrated in the accompanying drawings, to be taken as a part hereof, and wherein—

Figure 1 is a vertical longitudinal section through the trap, showing the entrance, the tilting plate with vertical side flange to close the entrance, and the apartments. Fig. 2 is a vertical transverse section on the line 2 2 of Fig. 1. Fig. 3 is a detail view of the end wall or closure of the death cell or apartment, showing the strangulating-openings therein. Fig. 4 is a detail perspective of the tilting plate or treadle.

Referring to the drawings, A designates the inclosure or house of the trap, preferably rectangular in construction, being composed of inclosing walls 1 2 3 4, a bottom 5, and a suitable roof 6, generally made of wood or of any other proper material. The roof may extend beyond the side walls, as at 7 8, forming eaves or cornices, and a step or shelf 9 is secured at the lower edge of the side wall in which the entrance is formed, upon which the birds may alight and be supported. In the bottom of the house is formed an opening 10, through which the dead birds may be removed, as desired. The opening 10 is closed by a horizontal turning-plate 11, pivotally secured to a pin 12, as indicated in the drawings. To one side of the middle of the house is secured a depending partition 13, reaching downward in the house a distance to afford sufficient room between its lower end and the bottom of the house to permit the tilting plate to move down and afford the escape or passage of the bird from the entrance chamber or apartment 14 to the death chamber or apartment 15. The bottom of the entrance-chamber consists of a tilting plate 16, pivotally supported on a shaft or bar 17 and formed on one side with a vertical side flange 18, formed with an extension 19, so that when the plate is tilted the extension of the flange will be moved down and close the entrance *e* to the apartment and prevent the escape or return of the bird to the outside. The inner end of the tilting plate lodges against the end of the partition 13 when in natural position, and to insure the return of the tilting plate to horizontal position after having been tilted and the bird has passed into the death-chamber the other end is reinforced or weighted, as at 20.

The outer end wall 3 is formed with one or more apertures 21, having enlarged upper ends and tapering elongations extending downward therefrom, as shown in the drawings. The enlarged upper ends of the openings 21 are preferably made circular and large enough to permit the passage of the head of the bird, so that when projected through the neck of the bird slips down into the tapering elongation, and death is soon produced by strangulation. This end wall is made of tin or polished sheet-iron, so that the effect desired is more speedily accomplished.

The house or trap may be secured in the place selected by any proper fastenings, or it may be suspended against a vertical surface by means of a hook or loop 22, engaged over a nail.

The number of the strangulating-slots may be increased to suit the size of the house; but a single slot will strangle two or more birds in succession, and it may be mentioned that by their final struggles or by interference or force of subsequently-trapped birds I have found several birds on the floor of the death-chamber and only one bird in a slot; but all bore the evidences of having been strangled.

The operation of the trap is as follows: The bird approaches and alights on the step and hops through the entrance, lodging on the tilting end of the tilting plate, his weight carrying down the inner end of the plate, and at the same time the side extension of the plate closes the entrance. The bird then finds his way through the passage between the end of the partition and the bottom of the house into the death-chamber, and the tilting plate is returned to a horizontal position, thereby imprisoning the bird in the death-chamber. As soon as the bird finds himself imprisoned he begins his efforts to escape and naturally seeks egress through one of the strangulating-apertures, where he at once becomes fixed and speedily dies.

What I claim is—

1. A bird-trap comprising an inclosure, provided with an entrance, a depending partition dividing the inclosure into two compartments constituting an entrance-chamber and a death-chamber, and arranged with a space between its lower end and the bottom of the inclosure, a tilting plate to open said space and close the entrance, and a wall in the death-chamber formed with elongated tapering slots, substantially as described.

2. A bird-trap comprising a house having an entrance, and an end wall formed with one or more elongated tapering slots, a partition dividing the house into two compartments and arranged with a space between its lower end and the floor of the house, and a tilting plate to permit and prevent passage under the said partition, and close the entrance to the house.

3. A bird-trap comprising a house having an entrance and divided into two apartments, having a passage between them, constituting an entrance-chamber and a death-chamber, one of the walls of the latter being provided with one or more elongated tapering slots, and a tilting plate in the entrance-chamber to permit passage therefrom to the death-chamber and prevent return thereto, substantially as described.

4. A bird-trap comprising a house having an entrance and divided into compartments, having a passage between them, constituting an entrance-chamber and a death-chamber, one of the outer walls of the death-chamber being provided with one or more tapering slots, and a tilting plate in the entrance-chamber to permit passage to the death-chamber and prevent return thereto, formed with a side extension to close the entrance to the house, substantially as described.

In testimony whereof I affix my signature in presence of two witnesses.

RICHARD T. HAYS.

Witnesses:
A. G. HEYLMUN.
E. H. BATES.